(12) United States Patent
Martini et al.

(10) Patent No.: US 9,531,740 B2
(45) Date of Patent: *Dec. 27, 2016

(54) SOFTWARE PROGRAM IDENTIFICATION BASED ON PROGRAM BEHAVIOR

(71) Applicant: iBoss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,558

(22) Filed: Mar. 17, 2016

(65) Prior Publication Data

US 2016/0269429 A1    Sep. 15, 2016

Related U.S. Application Data

(63) Continuation of application No. 14/644,151, filed on Mar. 10, 2015, now Pat. No. 9,294,492.

(51) Int. Cl.
*G06F 21/00* (2013.01)
*H04L 29/06* (2006.01)
*G06F 21/53* (2013.01)

(52) U.S. Cl.
CPC .......... *H04L 63/1416* (2013.01); *G06F 21/53* (2013.01); *H04L 63/0876* (2013.01); *H04L 63/145* (2013.01); *H04L 63/20* (2013.01)

(58) Field of Classification Search
CPC .................................................. H04L 63/145
See application file for complete search history.

(56) References Cited

U.S. PATENT DOCUMENTS

| | | | |
|---|---|---|---|
| 8,266,698 B1* | 9/2012 | Seshardi | G06F 21/53 726/22 |
| 9,009,819 B1* | 4/2015 | Savant | G06F 21/57 726/22 |
| 2007/0143827 A1* | 6/2007 | Nicodemus | G06F 21/6218 726/2 |
| 2009/0077663 A1* | 3/2009 | Sun | H04L 63/1416 726/23 |
| 2009/0240691 A1* | 9/2009 | Yano | G06F 17/30867 |
| 2010/0031347 A1* | 2/2010 | Ohto | G06F 8/65 726/19 |
| 2011/0286394 A1* | 11/2011 | Prasad | H04M 3/436 370/328 |
| 2014/0041037 A1* | 2/2014 | Bhatia | G06F 21/10 726/26 |
| 2014/0201838 A1* | 7/2014 | Varsanyi | H04L 63/1425 726/23 |
| 2014/0298315 A1* | 10/2014 | Boudreau | G06F 8/61 717/174 |

* cited by examiner

*Primary Examiner* — Morshed Mehedi
(74) *Attorney, Agent, or Firm* — Fish & Richardson P.C.

(57) ABSTRACT

Operations performed by a software application instance executed by a computing device are monitored. A determination is made that a particular operation performed matches an application signature representing a particular software application. In response, a match score is added to a total score for the software application. In response to determining that the total score is greater than or equal to a threshold, the software is classified.

22 Claims, 8 Drawing Sheets

SOFTWARE PROGRAM IDENTIFICATION BASED ON PROGRAM BEHAVIOR

The present document relates to computer security.

CROSS-REFERENCE TO RELATED APPLICATIONS

This application is a continuation application of and claims priority to U.S. application Ser. No. 14/644,151, filed on Mar. 10, 2015 (U.S. Pat. No. 9,294,492).

BACKGROUND

Malicious software includes software programs that can or does perform actions that can harm or work against the interest of a user or computer system owner. Examples of such software include "adware" programs that monitor user behavior and present ads to the user, "spyware" programs that monitor user behavior, and computer viruses that may perform various malicious actions, including deleting files, and taking control of the user's computer to perform unauthorized operations.

All software applications, whether malicious or not, perform various operations during execution, such as, for example, accessing the file system, opening network ports, changing values stored in memory, and other operations.

SUMMARY

A method is performed by data processing apparatus. The method includes identifying application signatures each representing one or more software applications, wherein each application signature includes operations each associated with a match score, and each application signature includes a total score threshold. The method further comprises monitoring operations performed by a software application instance executed by a computing device. The method further comprises determining that a particular operation performed by the software application instance matches an operation included in a particular application signature representing a particular software application. The method further comprises in response to determining that the particular operation matches the operation included in the particular application signature, adding a match score associated with the particular operation to a total score associated with the software application instance. The method further comprises in response to adding the match score to the total score, determining that the total score for the software application instance is greater than or equal to the total score threshold for the particular application signature. The method further comprises in response to determining that the total score is greater than or equal to the total score threshold, classifying the software application instance as the particular software application represented by the particular application signature.

Implementations can include any, all, or none of the following features. Monitoring operations performed by a software application instance executed by a computing device comprises: performing static analysis of one or more attributes of the software application instance. Performing static analysis of one or more attributes of the software application instance comprises determining if the one or more attributes match a preconfigured value in an application signature. One or more attributes includes at least one of the group consisting of a Secure Hash Algorithm (SHA) value, an MD5 value, and a program name. The method further comprising performing, responsive to classifying the software application instance as the particular software application represented by the particular application signature, a configured action associated with the particular application signature. The configured action is selected from a plurality of actions based on a determination of a type of the computing device. The determined type is a network security device; and the configured action comprises terminating network traffic with a server that served the particular software application. The determined type is a client device that resides on a network; and the configured action comprises powering down the client device. The configured action comprises presenting, responsive to classifying the software application instance as the particular software application represented by the particular application signature, a report identifying i) the particular software application and ii) the particular application signature. The report further comprises a human-readable description of the particular application signature. The method further comprising generating the report from a template document that includes at least an application-related fillable field and a signature-related fillable field using data associated with the particular application signature. The software application instance executed by a computing device is executed on a client device. The software application instance executed by a computing device is executed in a sandbox environment. Each application signature represents a particular class of software application include the one or more software applications. The method further comprising: monitoring operations performed by a second software application instance executed by the computing device; determining that a particular operation performed by the second software application instance matches an operation included in the particular application signature; in response to determining that the particular operation matches the operation included in the particular application signature, adding a match score associated with the particular operation to a total score associated with the second software application instance; in response to adding the match score to the total score, determining that the total score for the software application instance is less than the total score threshold for the particular application signature; and in response to determining that the total score is greater than or equal to the total score threshold, allowing the second software application instance to continue execution without classifying it as the particular software application.

System and computer storage media encoded with computer program instructions are providing for performing similar operations.

DESCRIPTION OF DRAWINGS

Like reference symbols in the various drawings indicate like elements.

DETAILED DESCRIPTION

Figure 1A:
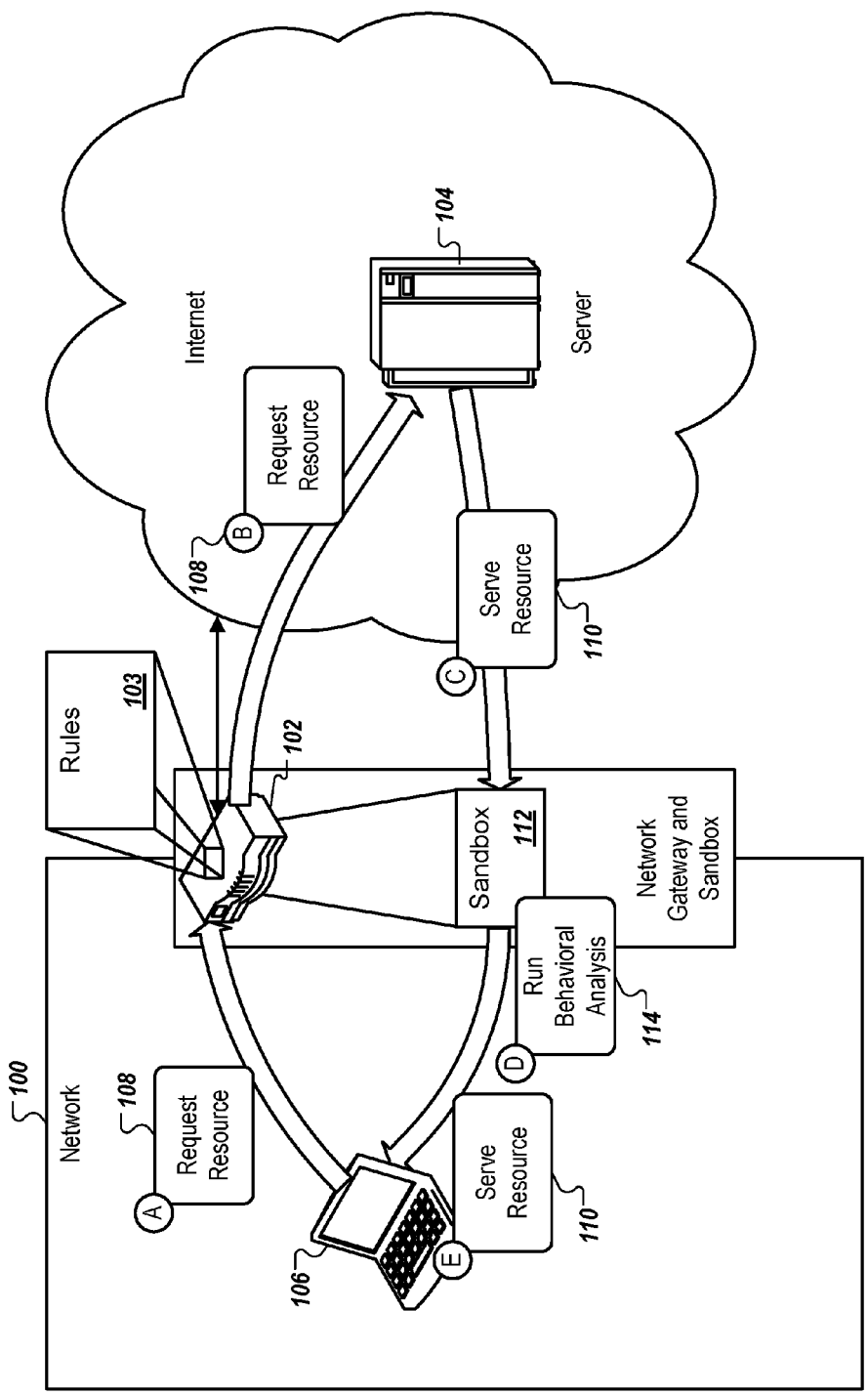
FIGS. 1A, 1B, and 1C are block diagrams of example computer systems in which the present techniques for identifying malicious application instances may be implemented.

Application instances (e.g., software programs, data files) executing on a computer system may include malicious instructions, such as viruses, macros, scripts, or other instructions embedded in the object that perform malicious operations without the user's knowledge. Security programs such as anti-virus software generally scan a computer for known malicious application instances (such as by filename or based on a file signature of a virus or other malicious program), or monitor activity on the computer to detect such objects. Some malicious programs may include functionality to evade such security programs, such as by changing their own instructions or data footprint so as not to be recognized by a scan (a technique known as polymorphism), or by attacking the security software itself. Such security software may therefore be ineffective in some cases.

Accordingly, the present application describes techniques for identifying software applications as possibly malicious by detecting objects that perform sensitive program operations before interacting with the user. A framework is described in which signatures can be generated to represent software applications based on the operations they perform. The signatures may include one or more operations known to be performed by the represented software application. Executing software application instances may then be monitored to identify operations performed by the instances that match operations in the application signatures. If a software application instance requests a particular operation included in a particular application signature, a match score associated with the particular operation may be added to a total score for the software application instance. In some cases, the total score represents a likelihood that the software application instance is an instance of the software application represented by the application signature. The particular application signature may also include a total score threshold indicating. If the total score associated with a software application instance is greater than or equal to the total score threshold for an application signature, the software application may be classified as an instance of the software application represented by the application signature. Upon classification, configured actions associated with the application signature may be performed, such as, for example, terminating the software application instance, deleting the software application from which the instance originated, quarantining the software application instance, alerting an administrator, updating the application signature based on information collected about the software application instance, or other actions. Some or all of these signatures may be used in different computer devices, providing a networked client device with a layered protection. For example, a network security device may identify a software application entering the network. Before passing the software application to the client device, the network security device may test the software application in a sandbox environment. If this software application does not get marked as risky by the network security device, the software application can be routed to the client device. At the client device, the execution of the software application can be monitored using some or all of the same signatures that were used in the sandbox.

In some cases, the application signatures may be used to identify software applications other than malicious ones. For example, an instance of a word processing program might be identified as that program based on the instance writing to a particular directory in the file system, based on registry keys it accesses during execution, display operations it requests during execution, or other operations.

The techniques described herein may provide the following advantages. By identifying application instances based on requested operations, the present techniques may be less affected by standard evasion techniques, such as polymorphism, used by viruses and other malicious programs, as the present techniques do not rely solely on detecting a program signature or other attribute of the malicious program. Generally, it is more difficult for a program to disguise its behavior than to disguise its structure, because altering the application behavior too greatly may prevent the application from achieving the objective it was originally designed to achieve. Further, by testing a software application with the same tests in different environments, a redundant protection scheme can provide computer devices with protection from context-dependent threats. Administrators can reuse signatures created for a virtual environment on live network environments without having to re-create a different set of signatures, saving time and making the signatures more effective as they may have already been tested in a virtual environment. Reports of malicious software applications can be generated to include information about what kind of signatures a software application matches and why a particular total score was calculated, giving network administrators or other users information needed to properly handle the risky application. By using files in a storage location to define signatures, the set of signatures used by my controlled by an administrated that can add, remove, and/or modify signatures as needed in a particular application. The administrator may also configure signatures to manage a particular threat. For example, a network being attacked by a custom advanced persistent threat can have signatures custom-created by the network administrator to defend against that advanced persistent threat. Also, the network administrator can create these rules without the inclusion of a third party (e.g., a security researcher or device vendor), thus providing the network administrator with the potential for a faster reaction time and the ability to properly manage disclosure of the attack. The signatures can include environment-specific tests and/or actions that are only applied in the applicable environment. For example, a signature may specify that a machine should power down when malware designed to encrypt the user's files is found.

Figure 1B:
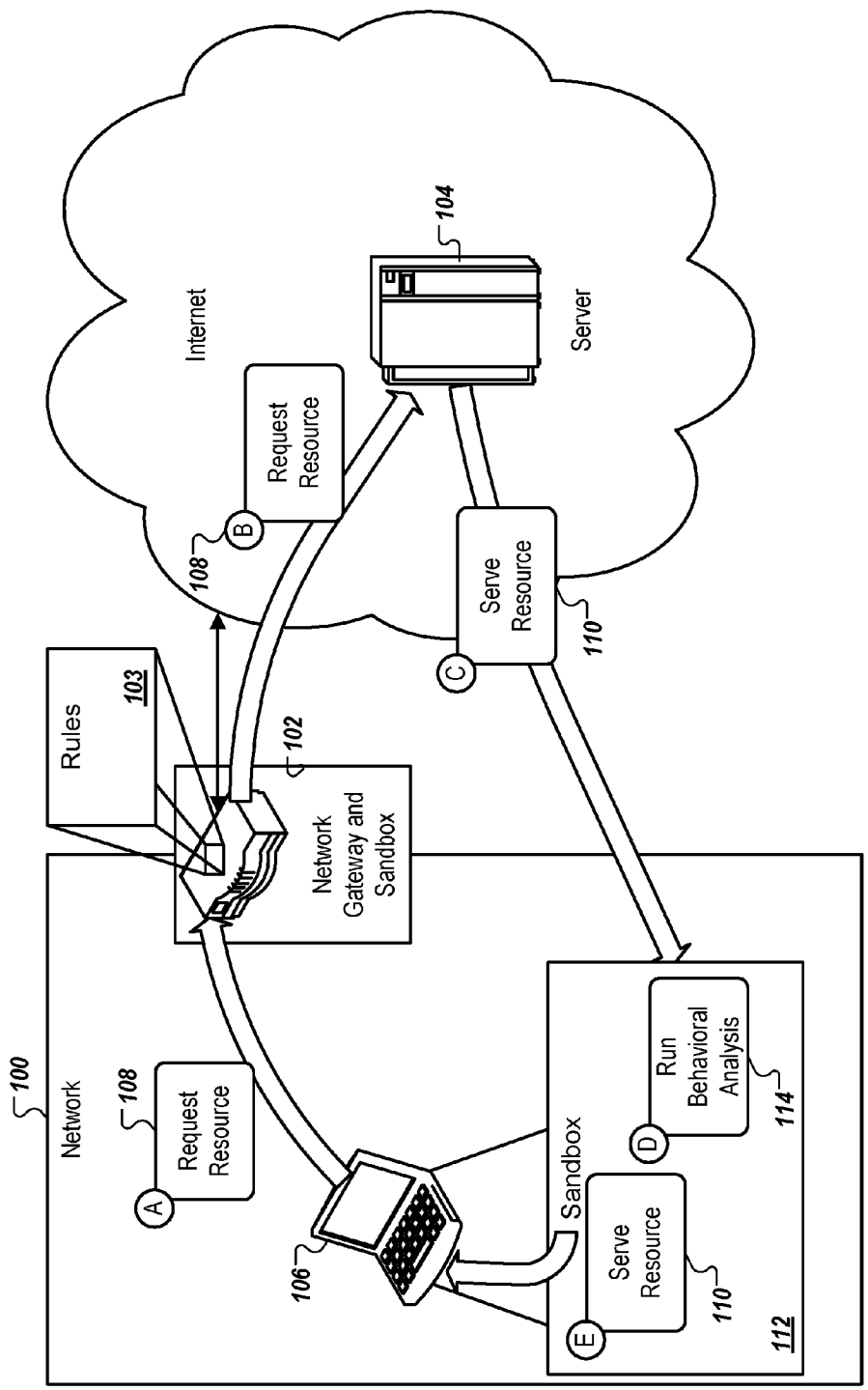

FIGS. 1A and 1B are block diagrams of example environments in which the present techniques for identifying malicious application instances may be implemented. The computer network 100 includes a network gateway 102 that includes a sandbox environment for running unknown software. Also shown in the network 100 is a browser device 106, which represents any appropriate computing device capable of browsing resources outside of the network 100. While not shown for clarity's sake, the network 100 can include other elements including, but not limited to, wireless and/or wired access points, file and/or application servers, routers, and network cables, as well as additional browser devices 106 and/or network gateways 102.

The network 100 can be configured to route some or all of the messages addressed outside the network 100 to the network gateway 102. The network gateway 102 can inspect the messages and, optionally, modify or drop some messages. For example, the network gateway 102 may be configured to prevent traffic from a particular class of application (e.g., chat, files sharing). The network gateway 102 may also be configured to intercept messages intended for a recipient outside of the network 100 and reply directly.

Additionally, the network 100 can be configured to route some or all of the messages addressed into the network 100 through the network gateway 102. The network gateway 102 can inspect the messages and, optionally, modify or drop some messages. For example, the network gateway 102 may be configured to prevent traffic from a particular class of application (e.g., chat, files sharing). The network gateway 102 may also be configured to intercept messages intended for a recipient inside of the network 100 and reply directly.

The network gateway 102 may intercept some traffic addressed to recipients inside the network 100, for example to enforce security or other network policies. For example, one or more messages that contain application instances (e.g., executable binary instructions, interpretable scripts, or the like) that are addressed to a recipient in the network 100 can be received by the network gateway 102. Instead of routing the one or more messages, the network gateway 102 may instead test the application instance to determine if it is likely to be malicious. If it is determined not likely to be malicious, the network gateway 102 may then route the message or message on their way to the addressed recipient. If the application instance is determined to be malicious, the network gateway 102 may take an appropriate action such as deleting the software, serving a webpage to the intended recipient indicating that the application instance was found to be malicious, or holding the software in quarantine of further testing or analysis. Examples of determining malicious application instances are described below.

In one example, the client device 106 generate a request message 108 addressed to a resource hosted on a server 104. This request may be, for example, a hypertext transfer protocol (HTTP) GET message that includes the universal resource locator (URL) of the server 104 or a resource hosted on the server 104. The network gateway 102 may, possibly after examining the request 108 for any applicable security or network policies, route the request 108 to the server 104.

The server 104 can receive the request 108 and determine that the server 104 should reply by serving the requested resource. To do so, the server 104 can create a response 114 that includes the requested resource. The server 104 can send this response 114 to the client device 106. To reach the client device 106, the response 110 can be routed through the network gateway 102. Instead of routing the response 110 to the client device 106, the network gateway 102 can intercept the response 110 to determine if the response 110 complies with security or other network policies of the network 100.

For example, the network gateway 102 may include rules 103 that define a security policies of the network. One such policy may specify that particular application instances should be tested in a sandbox. In general, a sandbox is a controlled execution environment where, for example, an unknown application instance can be run without allowing the application instance to access critical components of a computing device.

Instead of routing the reply 110 to the client device 106, the network gateway 102 can initiate a sandbox 112 and run the application instance attached to the reply 110. The sandbox 112 can allow the application instance to run, install, or open it using an associated application, such as using a word processing program to open a text document. The sandbox 112 can apply one or more tests to the application instance to determine if the application instance contains malicious functionality or is likely to contain malicious functionality. For example, the sandbox 112 may execute the application instance for a period of time, and compare the behavior and features of the running instance against a suite of signatures designed to identify potentially malicious or unwanted software applications. Examples of these signatures is described below.

If the application instance is determined to be malicious, the network gateway 102 may take an appropriate action. These actions may be specified by the rules 103. For example, the network gateway 102 may drop any communications with the server 104, may quarantine the received application instance, and/or may subject the application instance to additional testing. This additional testing may, for example, take longer than the initial tests used to determine the application instance is malicious. In some cases, the additional testing may be more accurate, but at the cost of processing time.

In these cases, a webpage or other message may be served to the client device 106 informing the client device 106 that the reply 110 has been blocked. If the application instance is found to be low-risk or found not to contain malicious behavior, the reply 110 may be sent to the client device.

Referring to FIG. 1B, the network 130 differs from the network 100 of FIG. 1A at least in that the client device 106 hosts the sandbox 112 instead of the network gateway 102 hosting the sandbox 112. In other examples, both the network gateway 102 and the client device 106 may host their own sandboxes 112.

Hosting the sandbox at the client devices 106 instead of the network gateway 102 may have a number of implications for the computers systems. For example, by hosting the sandbox 112 at the only network gateway 102, or all network gateways if a network has more than one, a network administrator can ensure that all traffic into the network can be subject to sandbox-based analysis. By hosting sandboxes at each client device 106, different sandboxes with different rules may be used by client devices of different types. For example, a server hosting customer payment data may have a more rigorous testing scheme than user workstation computers. In a case where the network administrator does not own or administer client device 106, the network administrator may only be able to configure a sandbox 112 at the network gateway 102 and the client device 106 owners may only be able to configure a sandbox 112 at their own client devices 106.

While the client device 106 is shown hosting the sandbox 112 to run the resource, the use of a sandbox is not required. For example, the client device 106 may host one or more sandboxes and run the resource natively, or may not host any sandboxes.

Figure 1C:
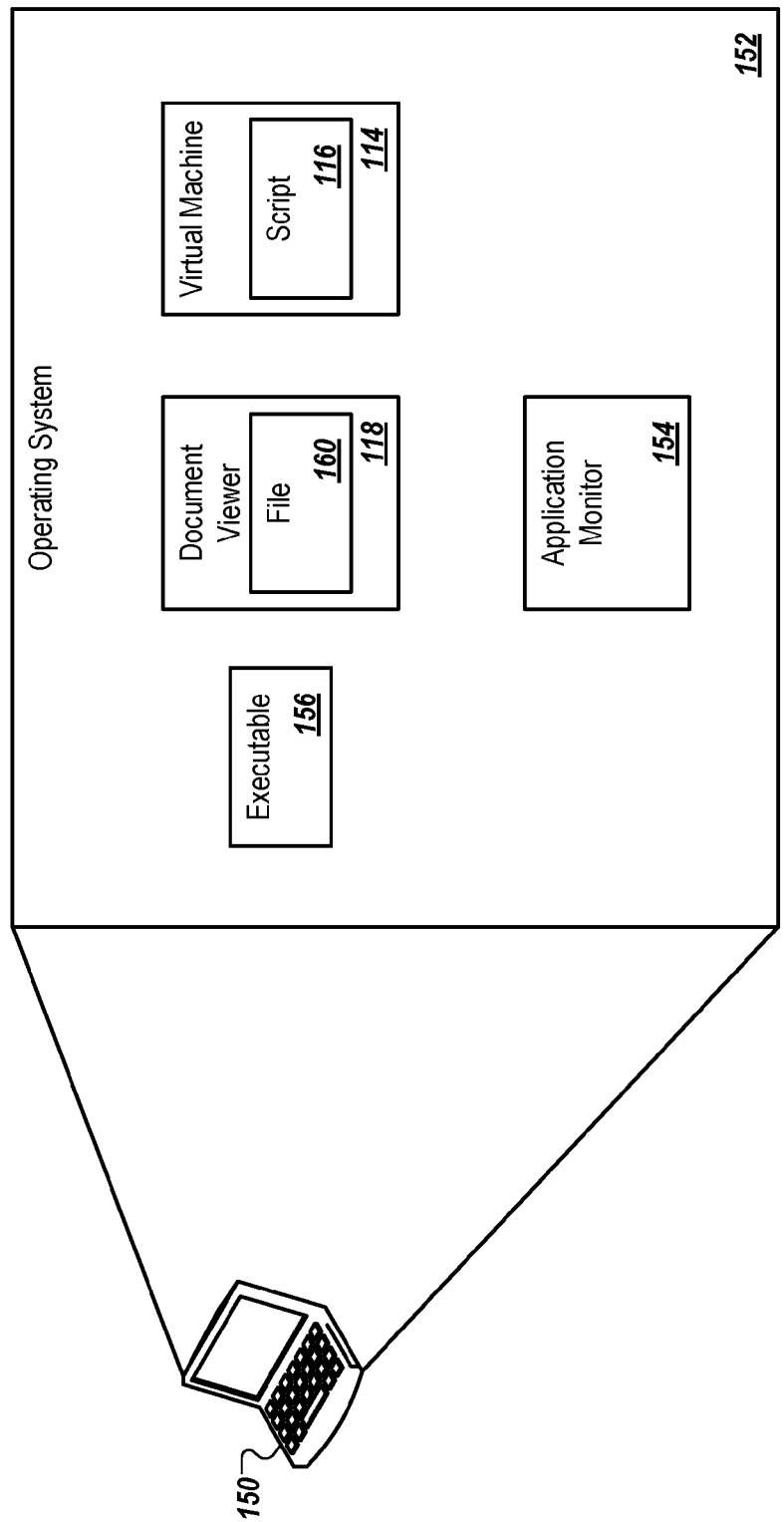

FIG. 1C shows an example of a computer 150 that monitors application instances. The computer 150 includes an operating system 152 that hosts an application monitor 154, an executable 156, a document viewer 158 displaying a file 160 and a virtual machine 162 running a script 164. While not shown for clarity's sake, the computer 150 can include other elements including, but not limited to, input and output components, networking components, and other hardware and software.

The computer 150 can include any type of computer system that can execute an application instance. Examples include, but are not limited to, desktop or laptop computers, server systems, mobile computing devices, or embedded computing devices (e.g., controllers in 'smart' appliances, automotive computing systems). The computer 150 includes and operating system 152, or other similar system, to host running application, provide those applications with an interface to the computer 150, to manage communications and storage, and for other purposes.

An application monitor 154 can run in the operating system, and/or may be a part of the operating system 154. The application monitor 154 may be configured to identify an execution of a application instance by the computer 150. The execution of a application instance can include, but is not limited to, the executable file 156 being executed, the file 160 being opened or used by the document viewer 158, and the script 164 running in the virtual machine 162.

In response to identifying the execution of the application instance, the application monitor 154 can monitor the activities of the executing application instance. For example, the application monitor 154 may monitor the system calls of the executable 156 to check for an indication of malicious behavior.

One type of malicious behavior includes an application performing sensitive actions before interacting with a user of the computer 150. For example, a normally functioning application will often draw a graphical user interface and present the interface to the user before accessing sensitive portions of the operating system 152. On the other hand, a malicious piece of adware may, instead of interacting with the user, install plug-ins to the user's web browser redirecting traffic to a network resource associated with the adware in order to monitor the user's web traffic.

If the application monitor 154 determines that the application instance has requested a sensitive action before interacting with a user of the computer 150, the application monitor can classify, or cause another element to classify, the running application instance as a malicious application instance. For example, the application monitor 154 may report to security software on the computer 150 (not shown) that the executable 156 has written data outside the executable 156's directory before interacting with the user. The security software may use this as one signal to determine if the executable 156 is to be classified as malicious. For example, if the executable 156 is on a whitelist of known-good application, the executable 156 may be allowed to run as normal. If, on the other hand, the executable 156 provides other signals of risk (e.g., newly loaded onto the computer system 150, containing encrypted containers that are decrypted at runtime, sporadically sending large amounts of data over the network) the security software may delete, isolate in a sandbox, or otherwise handle the executable 156 in a way that protects the computer 150.

In some cases, combinations of the systems described in FIGS. 1A-1C may be used. For example, the network gateway may test an incoming software application against a set of signatures, and then the client 106 or 150 may test the incoming software again. Such a configuration may provide a computer device with defense in depth through redundant protection against malicious applications. For example, some if a sandbox test performed by a network security device tests a software application and determines that it is not a malicious application, the client system can still test the software application an additional time. This may be useful, for example, in cases where a software application displays different behavior in different environments.

In some cases, the software application to be tested may not be an incoming software application. For example, the client 106 or 150 may be configured to monitor the behavior of some, any, or all application running natively or in managed environments (e.g. sandboxes). For example, component of the operating system or an installable security application may perform the testing described in this document on all running applications, applications lacking known signed certificates, or a sample (random or otherwise) of software application instances.

Consider a Trojan program (e.g., a software application including a malicious payload) that is designed to deploy a malicious payload only if it detects a particular operating system having a known vulnerability. If that vulnerability is not detected, the Trojan program creates a user interface window for a video game. A client on a network can attempt to download this Trojan program. Before routing the Trojan program to the client device, a network security device (e.g., a router, a firewall, or other network attached device) can test the Trojan program in a sandbox environment. If the sandbox environment does not emulate the vulnerable operating system, the Trojan Program may act like an innocuous video game. As such, the network security device may calculate a total score based on the behavior of an instance of the Trojan program that does not classify it as the Trojan program. The network security device may then route the Trojan program to the client device that requested it. Once installed there, the Trojan program may attempt to deploy its malicious payload. By monitoring the execution of an instance of the Trojan program, the client device may detect the behavior of the malicious payload upon deployment, classify the instance as the Trojan program, and take appropriate action. For example, the client application may terminate the Trojan program and alert a network administrator.

There are other types of application that may be configured to behave differently in different environments. For example, some malware is known to sleep in virtual environments and activate outside of virtual environments. A "spearfishing attack" may be configured to only deploy if a particular user or device configuration is found. An unwanted application plug-in (e.g., bundled into another program's installer application) may only install if the target application is found. Testing in both the virtual and non-virtual environments may be used to successfully identify any of these types of attacks, as well as other types of advanced persistent threats, advanced evasive threats, and advanced evasive malware.

In example where different devices monitor the execution of a software application, each device may use the same, or some of the same, signatures to test the software application. For example, a set of signatures may be developed to detect a particular unwanted toolbar application. These signatures may dynamic testing such as monitoring the user preferences of a web browser and static testing such as examining the toolbar application to see if it contains a class known or believed to be common to unwanted toolbars. These signatures may be used by any kind of computing device (e.g., a network computing device, a client device, a device hosting a sandbox) monitoring the execution of a software application.

In addition or alternatively, some but not all of the devices may use different rules, even if those devices are all administered by the same organization. For example, a suite of sandbox-specific signatures crafted to catch behavior of applications attempting to escape a sandbox. Example behaviors include, but are not limited to return-oriented programming, writing to memory locations outside of a permitted range, and attempting to escalate execution privileges. Devices that run applications in a sandbox environment may be given these signature while, optionally, devices that don't run applications in a sandbox may not. Other suites of signatures like this can include, but are not limited to, operating system specific signatures, hardware specific signatures, or user specific signatures. In addition to feature-specific signatures, devices may also use universal suites of signatures that can be use universally (e.g. for every device under a particular administration, on a network, or otherwise logically grouped).

The signatures can have associated actions. For example a file defining a signature may identify, reference, or otherwise associate the signature with one or more action. These actions might include, for example, generating a report from a template to describe the type of software application identified, closing a network communication channel, deleting the software application, terminating the software application's running instance, or powering down the device executing the software application.

The action may be conditional based on the type of device running the test. For example, a particular or pair of signatures may specify that a network security device be configured to terminate a client's communication with a server, while a client device be configured to shut down. The signature may also include universal actions to be performed without regard to the device running the test. For example, a reporting action may be specified as universal such that any detection by any device results in report generation.

Reports when a signature is matched may be programmatically generated. In some cases, this generation may be automatic—that is, without specific user input to cause the report to be generated. One process for generating this report is to create a copy of a document template (e.g. of a webpage, of an email, of a text message) and to populate fields of that template with information about the signature, the environment, the application, etc. This report may be logged and/or transmitted, for example to a network administrator tasked with protecting a network and/or to a security researcher tasked with identifying trends in the computer security field.

The number of times that a software application is tested may dependent on the configuration of the network or networks to which a client device is connected. For example, a client device may reside on a network protected with a network security device that performs the testing described in this document. While on that network, the client device may be protected by two layers of security—one layer being the testing by the network security device and one layer being the testing performed by the client itself.

Later, that client device may leave the network and join another network (e.g., a user takes their laptop from their school to a coffee shop). This new network may not be configured to provide this testing. In this configuration, this same client is now protected by only a single layer—the testing performed by the client itself.

Once connected to the second network, the client may virtually join the first network using a Virtual Private Network (VPN) client. Some VPNs are configured such that general web browsing is routed through the virtual network before reaching the client. The client may or may not be protected by another layer of protection depending on if the VPN is configured to perform the testing described. This usage may be repeated for any sort of technologically appropriate overlay network.

Signatures may be available for user inspection, creation, an editing. For example, a suite of signatures may be a collection of files stored by a computing device (e.g., in the rules 103) or otherwise accessible to the computing device. This signature files may be in a standard or custom file format that a user may be able to view and/or edit in a human-readable form. One such form is a text file (e.g., an Extensible Markup Language (XML), JavaScript Object Notation (JSON), or other file) containing regular expressions (regexes) or other Boolean matching rules. As such, signatures may be created by a variety of users, including but not limited to, network administrators, the users of a single client device, security professionals and device vendors.

Testing using these signatures may include both static and dynamic testing. In general, static testing includes the testing of a static portion of a software application or testing of the application without the need to run the software application. Example of static testing include, but are not limited to, examination of a file, comparison of a hash of the software application (e.g., Secure Hash Algorithm (SHA), MD5), identification of a pseudorandom number in the software application (e.g., as a registry value), or the presence or absence of a particular software component (e.g., a cryptographic library and/or an opaque application instance).

In general, dynamic testing includes observations made while an instance of the software application is executing. Examples of dynamic testing include, but are not limited to, examination of system calls by the software application, documenting data written to memory, and monitoring network communications made by the software application.

A test suite of signatures can be configured to include a list of categories, each represented for example by one text file. Each category may include, for example, configuration data and a list of signatures. The configuration data may include, for example, variable values set for a particular category. The list of signatures may be a list of regular expressions (regexes) or other Boolean matching rules. In general, a regex are a sequence of characters that forms a search pattern, mainly for use in pattern matching with strings, or string matching. For each such signature, a weight may be assigned that may indicate, for example, how dispositive a rule is. For example, if a rule is very likely to be dispositive to determining that a software application fits a particular profile, the weight may be higher than for a rule that is only slightly indicative that a software application fits a particular profile.

When a software application and/or software application instance is tested against a category of signatures, each matching signature can be assigned a mark and a summation of all marked signatures weights may be made. Then, the number of marks and/or the summarized weights may be compared to one or more threshold values to determine a risk metric for the software application. These threshold values may be defined, for example, in the configuration data of the category.

A single threshold may be used to classify an instance of a software application as either risky or not, of a particular class of software or not, etc. Multiple thresholds may be used to place the instance of a software application into a multi-band metric. For example, a software application instance is tested against a particular category, and the result is two marks and a nineteen weight.

If there is only a single threshold value of weight=20, this software application could be categorized as failing the test. If, in another configuration, threshold values of weight=15 and weight=20, the software application can be categorized as moderately risky, or moderately matching, etc. A number of marks may also be used as a threshold. For example, a category may be configured with thresholds of weight=15 and marks=3. In this example, the tested software application instance can also be categorized as moderately risky, or moderately matching, etc.

An example of a single category of signatures is shown below. This category is created in a single .JSON text file. As shown, the category of signatures includes configuration at the beginning of the file, followed by a list of signatures. Each signature specifies a Boolean test an associated tags used for the test, in reporting the results of the signature, etc. Although this particular example is shown, other formats are possible.

```
{
    "version": 1,        //the overall signature protocol version, has nothing to do
with the signature version
    "namespace": "examplespace",        //source of the signature, 1 =
human-generated, 2 = auto-generated
    "sid": 1,        //1-1,000,000 are reserved
    "name": "cryptomalware",
    "description": "Behavioral signature for crypto malware.",
    "revision": 1.1,
    "classification": "trojan-activity",    //human readable classification
    "category": "malware",        //general category, spyware, malware, exploit,
etc.
    "priority": 1,        //1-4 (1 being highest)
    "license": "iboss, Inc.",
    "author": "example threat labs",
    "osType": "all",        //what operating system is this relevant to? (all, or
list specific examples)
    "osVersion": "all",        //what version of the operating system is this
relevant to (all, or list specific examples),
    "osPlatform": "all",        //what os platform (32bit, 64bit, all)
    "actions": ["log","block"], // from enum of ["alert", "log", "block", "pass"
"powerdown"] //what to do when signature matches (alert, email, text, power
down) // powerdown is only available in live environments
    "reference": "http://firesphere.iboss.com/ref?id=123",
    "matchTotalScore:": 3,        //the total score that makes this signature a
100% match
    "enabled": true,        // enables/disables the rule
    "signature": {
        "files": [
            {
                "signatureTag": "eicar in program files",    //arbitrary name
                "score": 1,    //adds to the match_total_score
                "sizeMinBytes":0,
                "sizeMaxBytes":0,        //0 = no max
                "fileTypes":["any", "binary", "ascii", "executable" ],
                "filePath": "C:/ProgramFiles",
                "searchRecursive": true,
                "recursiveSearchDepth": 0,    //0 = infinite, 1 = the path above, 2 = the path
above + its direct folders
                "matchPattern": "*eicar*", //pcre regular expression
                "matchLowercase": 0,        //convert the sample to lowercase before
applying match patterns
                "operationType": ["any", "downloaded", "copied", "opened", "moved",
"read", "write", "replaced", "deleted", "created" ]
            }
        ],
        "registryKeys": [
            {
                "signatureTag": "registry tampering",    //arbitrary name
                "score": 1,        //adds to the match_total_score
                "keyPath": "HKEY_LOCAL_MACHINE/SOFTWARE",
                "searchRecursive": true,
                "recursiveSearchDepth": 0,        //0 = infinite, 1 = the path above, 2 = the path
above + its direct reg keys
                "matchPattern": "crypto",    //pcre regular expression
                "matchLowercase": 0,        //convert the sample to lowercase before
applying match patterns
                "operationType": ["any", "created", "opened", "renamed", "read", "write",
"deleted" ]
            }
        ],
        "osHooks": [
            {
                "signatureTag": "system tampering",    //arbitrary name
                "score": 1,    //adds to the match_total_score
                "hookMatchPattern": ["WH_MSGFILTER"],        //pcre regular expression
                "hookMatchLowercase": 0,        //convert the sample to lowercase
before applying match patterns
                "methodMatchPattern": "SetWindowsHook",        //pcre regular expression
                "methodMatchLowercase": 0,        //convert the sample to lowercase
before applying match patterns
                "operationSuccessful": ["true", "false", "any"]    //only match if hook was
successful, etc
            }
        ],
        "mutexes": [
            {
                "signatureTag": "mutex created",    //arbitrary name
                "score": 1,        //adds to the match_total_score
                "matchPattern": "*lock*",        //pcre regular expression
                "matchLowercase": true,        //convert the sample to lowercase
```

```
before applying match patterns//
        "operationType": ["any", "created", "opened" ],
        "operationSuccessful": ["true", "false", "any"]   //only match if hook was
successful, etc
      }
    ],
    "libraries": [
      {
        "signatureTag": "dll present",   //arbitrary name
        "score": 1,        //adds to the match_total_score
        "matchPattern": "*user32*",   //pcre regular expression
        "matchLowercase": true,      //convert the sample to lowercase
before applying match patterns//
        "operationType": ["any", "loaded", "created", "deleted", "modified" ],
        "operationSuccessful": ["true", "false", "any"]   //only match if hook was
successful, etc
      }
    ],
    "services": [
      {
        "signatureTag": "service detected",   //arbitrary name
        "score": 1,        //adds to the match_total_score
        "matchPattern": "*mpssvc*",   //pcre regular expression
        "matchLowercase": true,      //convert the sample to lowercase
before applying match patterns//
        "operationType": ["any", "deleted", "opened", "controlled", "created",
"started", "service_manager" ],
        "operationSuccessful": ["true", "false", "any"]   //only match if hook was
successful, etc
      }
    ],
    "processes": [
      {
        "signatureTag": "process signature",   //arbitrary name
        "score": 1,        //adds to the match_total_score
        "processIds": [225,335], // would this ever be useful?
        "matchPattern": "*lock*",   //pcre regular expression
        "matchLowercase": true,      //convert the sample to lowercase
before applying match patterns//
        "operationType": ["any", "present", "injected", "created", "terminated",
"shellcommand"],
        "parentMatchPattern": "*lock*",         //parent process name
        "parentMatchLowercase": true
      }
    ],
    "staticSamples": [
      {
        "signatureTag": "the file sample itself",   //arbitrary name
        "score": 1,        //adds to the match_total_score
        "matchType": "magic_literal",         //magic_literal, trid, file_content,
memory_map
        "matchPattern": "*eicar*",        //pcre for magic_literal/trid. hex for
file_content/memory_map
        "matchLowercase": true
      }
    ],
    "networkActivity": [
      {
        "signatureTag":"dns network match",
        "score": 1,        //adds to the match_total_score
        "protocol": "dns",              //dns, tcp, udp, https, ip
        "matchType": "query",             //query, response (may be extended to
include things like ttl, etc.
        "matchPattern": "*google.com*",         //pcre regular expression
        "matchLowercase": true      //convert the sample to lowercase before
applying match patterns
      },
      {
        "signatureTag":"ip network match",
        "score": 1,        //adds to the match_total_score
        "protocol": "ip",           //dns, tcp, udp, http, ip, any
        "matchType": "source_ip",        //source_ip, destination_ip
        "matchPattern": "74.125.*"       //pcre regular expression
      },
      {
        "signatureTag":"tcp network match",
        "score": 1,        //adds to the match_total_score
        "protocol": "tcp",           //dns, tcp, udp, http, ip, any
        "matchType": "source_port",          //source _port, destination_port
```

```
        "ports": ["80", "25-30"]        //single ports and port ranges
      },
      {
        "signatureTag": "udp network match",
        "score": 1,        //adds to the match_total_score
        "protocol": "udp",        //dns, tcp, udp, http, ip, any
        "matchType": "source_port",        //source_port, destination_port
        "ports": ["80", "25-30"]        //single ports and port ranges
      },
      {
        "signatureTag": "http network match",
        "score": 1,        //adds to the match_total_score
        "protocol": "http",        //dns, tcp, udp, http, ip, any
        "matchType": "url",        //url, header_option
        "matchPattern": "google.com/fetch.php?*",        //pcre regular expression
        "matchLowercase": true        //convert the sample to lowercase before
applying match patterns
      },
      {
        "signatureTag":"https network match",
        "score": 1,        //adds to the match_total_score
        "protocol": "https",        //dns, tcp, udp, http, ip, any
        "matchType": "cert_domain",        //cert_domain
        "matchPattern": "www.google.com",        //pcre regular expression
        "matchLowercase": true        //convert the sample to lowercase before
applying match patterns
      }
   ]
 }
}
```

Figure 2:
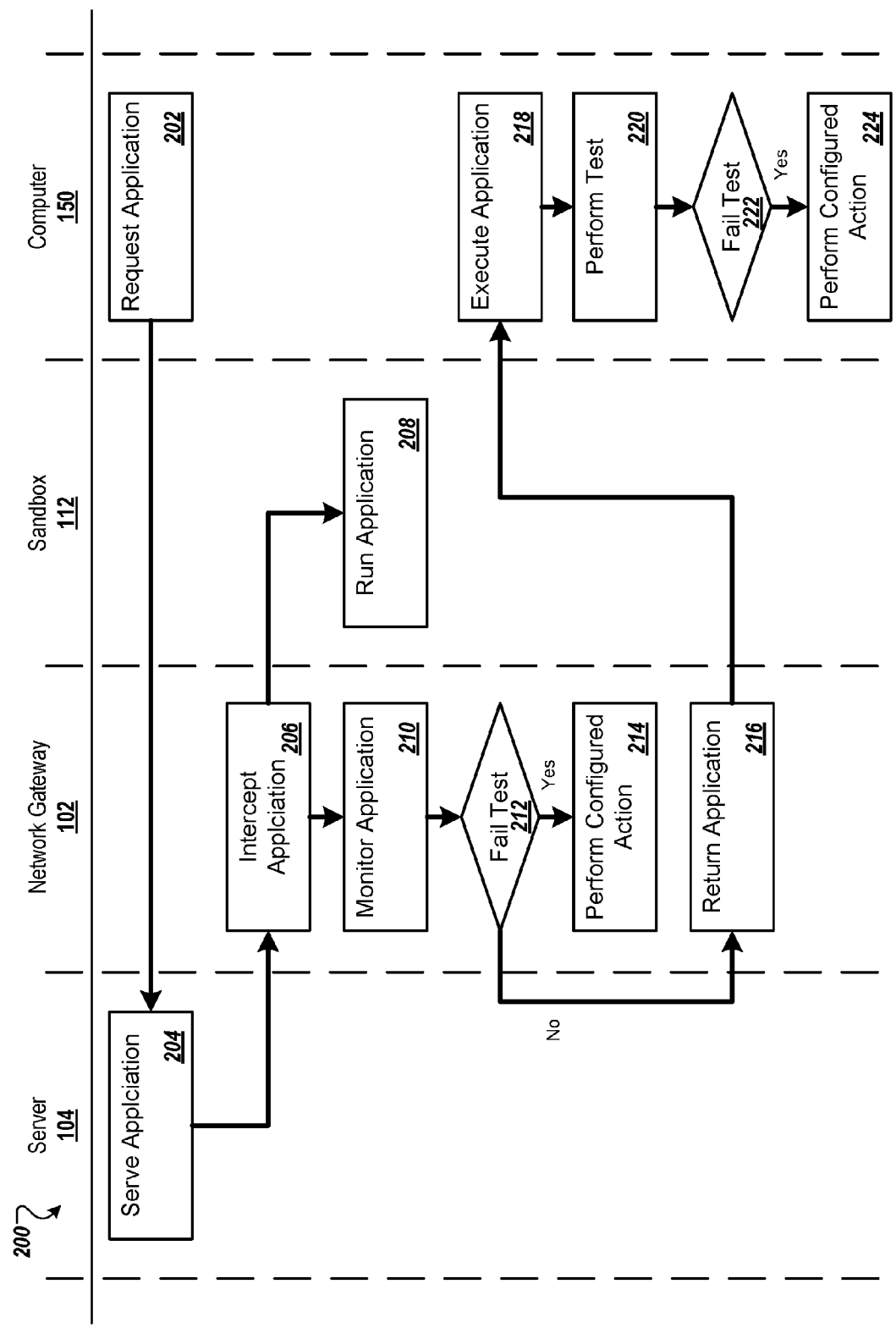
FIG. 2 is a swim-lane diagram of an example process for identifying malicious application instances.

FIG. 2 is a swim-lane diagram of an example process 200 for testing software for signs of risk. For clarity, the process 200 is being described with reference to the elements shown in FIGS. 1A and 1C. However, other components, including but not limited to those shown in FIG. 1B, may be used to perform the process 200 or similar processes.

The computer 150 requests 202 a software application. The server 104 serves 204 the software application. For example, a user on the computer 150 sends a request to the server 104 (e.g., a hypertext transfer protocol (HTTP) GET request, a file transfer protocol (FTP) RETR command) to serve a software application. In response, the server 104 can marshal a copy of the software application and send the software application to the computer 150 in an appropriate reply message.

The network gateway 102 intercepts 206 the software application. For example, the network gateway 102 can monitor traffic addressed to and from the computer 150 and intercept the traffic containing the software application.

The network gateway 102 runs 208 an instance of the software application in the sandbox 112 and monitors 210 the execution of the software application in the sandbox 208. For example, instead of routing the intercepted traffic to the computer 150, as it is addressed, the network gateway 102 can run a copy of the intercepted software application in a security sandbox on the same or different hardware. While the instance of the software application runs, the network gateway 102, or another appropriate device, can monitor the instance of the software application. This monitoring can include comparing the software application instance to one or more signatures that define tests to determine if the software application fits a profile of software that should be excluded from computers on the network.

If the software application fails 212 the test, the network gateway 102 performs a configured action 214. For example, if the software application instance matches one or more signatures, or if the number or weight of matching signatures is greater than one or more threshold values, the network gateway 102 can perform one or more configured actions. These actions can include actions specified by the signatures or other files, or may be performed if any software application instance fails a test. These actions include, but are not limited to creating an alert, generating a log entry, blocking the software application, and/or passing the software application to the computer 150.

In the case of passing the software application, the particular signature tripped may be configured to identify software applications that are desired. For example, consider an example of a corporate network that deploys a browser toolbar to the client machines on the network. This corporation's toolbar may be the only desired toolbar and all other toolbars should be excluded. A set of signatures that is configured to identify any toolbar would match both undesired and the desired toolbar.

In such a case, the corporate network's administrator may make a set of signatures with negative weight targeting the corporate toolbar only (e.g., by matching a publisher certificate signed by the corporation). In this case, the signatures that identify any toolbar may generate a positive weight offset by the negative weight of the targeted corporate-toolbar signatures.

In another case, the corporate network's administrator may make a category of signatures to identify the corporate toolbar, and, if the category finds a match, pass the software application to its intended recipient instead of blocking it or generating an alert.

If the software application passes the test (at 212), the network gateway 102 returns the software application to the computer 150 at t. For example, if the software application's instance does not exhibit any features or behavior that identify the software as unwanted, the network gateway 102 can pass the software application to the computer 150

At 218, the computer 150 executes the software application and performs 220 a test on the executing instance of the software application. For example, the computer can run, interpret, load, or otherwise execute the software application. This execution may be monitored by the computer 150, using the same, similar, or different rules than the network gateway 102 used.

If the software application fails the test (at 222), the computer 150 performs 224 the configured action. For example, the computer 150 may take the same, similar, or different action than those of the network gateway 102, depending on the configuration.

Figure 3A:
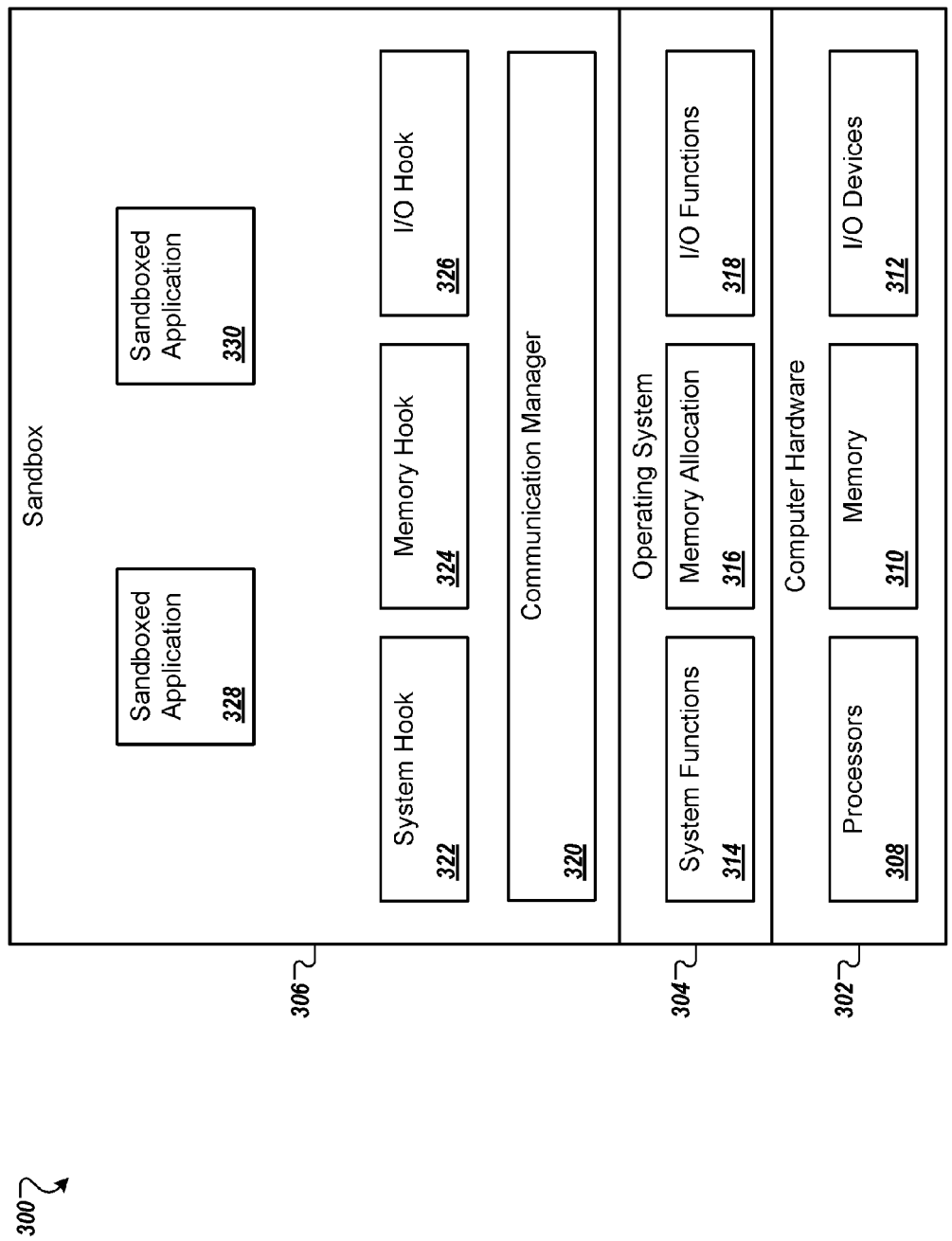
FIGS. 3A and 3B are block diagrams of example computing sandbox techniques.
Figure 3B:
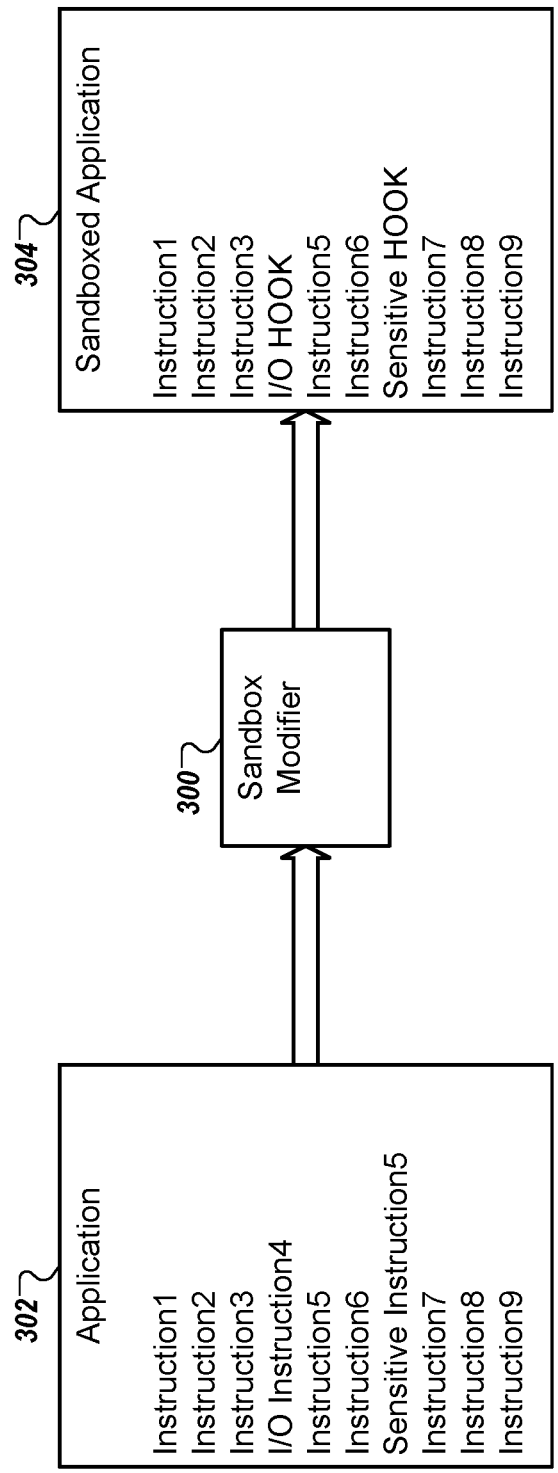

FIGS. 3A and 3B are block diagrams of example computing sandbox techniques.

In FIG. 3A, a computer system 300 hosts a sandbox for running applications. The computer system 300 includes hardware 302, an operating system 304 running on the hardware 302, and a sandbox 306 hosted by the operating system.

The hardware 302 includes the collection of physical elements of the computer system 300. The hardware 302 shown includes a processor 308, memory 310, and I/O devices 312, though other configurations are possible. The processor 308 is one or more computing processors capable of carrying out computing instructions. The memory 310 includes long term storage (e.g., hard disk) and system memory (e.g., Random Access Memory (RAM) components). The I/O devices 312 include hardware for input and output, such as for communicating with users and other computer systems. Example I/O devices include, but are not limited to, keyboards, pointer devices, speakers, and network connections.

The operating system 304 may run on the computer hardware 302. In general, the operating system is software that manages computer hardware and software resources and provides common services for computer programs. The operating system includes system functions 314. These system functions 314 can provide access to the computer hardware, or can provide a single interface for common functions. Example system functions 314 include, but are not limited to, functions for establishing a service or daemon, reading an environment variable, and turning the computer system 300 off. Memory allocation functions 316 allow a caller to allocate, de-allocate, read, write, lock, or otherwise interact with the memory 310. I/O Functions 318 can allow a caller to interact with I/O devices 312. Example I/O functions include, but are not limited to, functions for establishing network sockets, writing to display buffers, and reading input from pointer devices.

The operating system can host one or more application. These application include, but are not limited to, web browsers, document editors, web servers, video games, and other applications which may or may not have user-facing components. Additionally, the operating system 304 can host one or more other execution environments. One such execution environment is the sandbox 306.

The sandbox 306 includes an execution environment for hosting one or more applications, including sandboxed applications 328 and 330. Instead of accessing the system functions 314, memory allocation 316, and I/O functions 318, the sandboxed applications 328 and 330 may be permitted only to access system hooks 322, memory hooks 324, and I/O hooks 326. In some configurations, the system hooks 322, memory hooks 324, and I/O hooks 326 may have the same interfaces as the system functions 314, memory allocation 316, and I/O functions 318 and may imitate the interfaces of the operation system 304. In some configurations, the system hooks 322, memory hooks 324, and I/O hooks 326 may have a different interface or interfaces. When making a call to a system hooks 322, memory hooks 324, or I/O hooks 326, a communication manager 302 in the sandbox 306 may examine the call and determine how to respond to the call, if at all. In some cases, the call may be passed to a corresponding system function 314, memory allocation 316, or I/O function 318. In some cases, the communication manager 320 may generate a response without communicating with the operating system. Additionally, the communication manager 320 can perform additional functions related to these calls. Calls may be logged and/or analyzed to determine, for example, if the call attempts to perform a restricted action or a permitted action on a restricted resource. The communication manager 320 may treat calls from each application 328 and 330 differently or the same, depending on the configuration.

The sandbox 306 may be used for one or more of a variety of functions. In one use, the sandbox 306 is used to provide security to the computer system 300 while the sandboxed application 328 and 330 are run. For example, the sandboxed application 328 and 330 may be from an untrusted source or may be known to have malicious behavior. By monitoring communications between the sandboxed application 328 and 330 and the operating system 304, the communication manager 320 can prevent the sandboxed application 328 and 330 from having an undesirable effect on the operating system 304.

In another use, the sandbox may be part of a virtual machine. Virtual machines are logical recreations of a full or partial computing system hosted on a real computer system like the computer system 300. Virtual machines may be used in some cases to interpret scripting language application, allowing the scripting language to be platform agnostic. Additionally or alternatively, virtual machines may be used to provision a single computer system 300 to multiple uses. For example, if the computer system 300 is a networked server computer, multiple virtual servers may be provisioned on the single real server.

In yet another use, the sandbox may be part of an emulator. Emulators are a specific type of virtual machine where the system hooks 322, memory hooks 324 and I/O hooks 326 provide a different interface than what is provided by the operating system 304. For example, a virtual machine emulating a mobile computing device may be used on a desktop computing device running a different operating system. This emulated mobile computing device may be to test an application that is developed on the desktop device but targeted for use in the mobile device.

In FIG. 3B, a sandbox modifier 350 replaces instructions in an application 352 to create a sandboxed application 354. This replacement process may be used in addition to or in the alternative to the sandbox 356 previously described.

As part of loading the application 352 for execution, a computer system can use the sandbox modifier 350 to identify and replace some of the instructions of the application 352. For binary executable applications 352, the instructions replaced include binary computer instructions. For scripted applications 352, the instructions replaced include scripting instructions.

The sandbox modifier 350 can inspect the application 352 and identify any instructions that, for example, include calls to the operating system or include calls to sensitive computing resources. In the example shown, the sandbox modifier 350 identifies two instructions, "I/O instruction4" and "Sensitive Instruction5." Before loading the application 352, the sandbox modifier can modify the application 352 by replacing these two instructions with calls to, for example, a sandbox interface that includes hooks for function calls to the operating system. By performing such a replacement, the sandbox modifier 354 can ensure that the application 352 does not attempt to call an unauthorized function and/or "escape" the sandbox.

Figure 4:
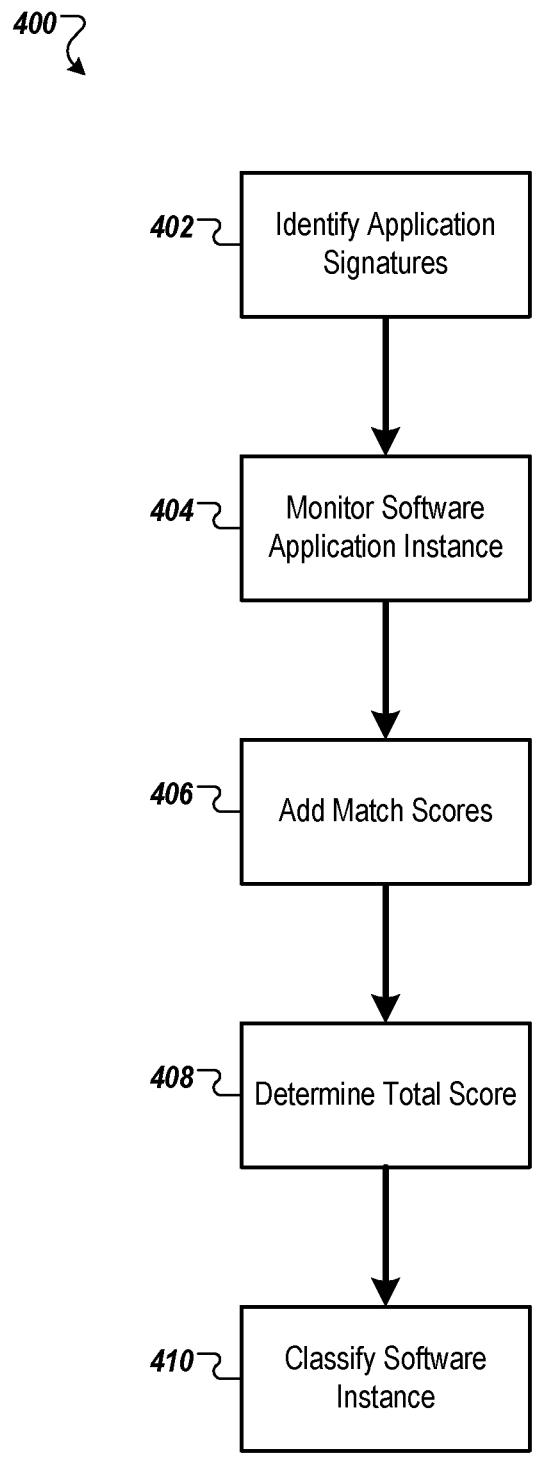
FIG. 4 is a flowchart of an example process for identifying malicious application instances.

FIG. 4 is a flowchart of an example process 400 for testing software for signs of risk.

At 402, application signatures are identified. Each application signature represents a particular software application. Each application signature includes operations each associated with a match score. Each application signature includes a total score threshold. For example, a mobile computing device's security manager can download a pack of application signatures that each represent a particular software application found to be unwanted (e.g., malicious, containing unwanted features or security flaws).

At 404, operations performed by a software application instance executed by a computing device are monitored. For example, as the mobile computing device's operating system launches and executes applications, the operating system monitors operations performed by the software applications.

At 406, it is determined that a particular operation performed by the software application instance matches an operation included in a particular application signature. For example, the operating system may identify a Boolean expression in a signature that, for a particular operation of a software application, is found to be true.

At 408, in response to determining that the particular operation matches the operation included in the particular application signature, a match score associated with the particular operation is added to a total score associated with the software application instance. For example, the operating system may access a stored total score from a user's account in a cloud serve and add to the total score the match score. The operating system may then report the updated match score to the cloud service. Alternatively, the mobile device's operating system may report the match score, and the cloud service may compute the total score.

At 410, in response to adding the match score to the total score, it is determined that the total score for the software application instance is greater than or equal to the total score threshold for the particular application signature. In response to determining that the total score is greater than or equal to the total score threshold, the software application instance is classified as the particular software application represented by the particular application signature. For example, the mobile computing device may delete the software application, and the cloud service may generate an anonymized and/or aggregate report for a security researcher about the prevalence and behavior of the unwanted software application.

Figure 5:
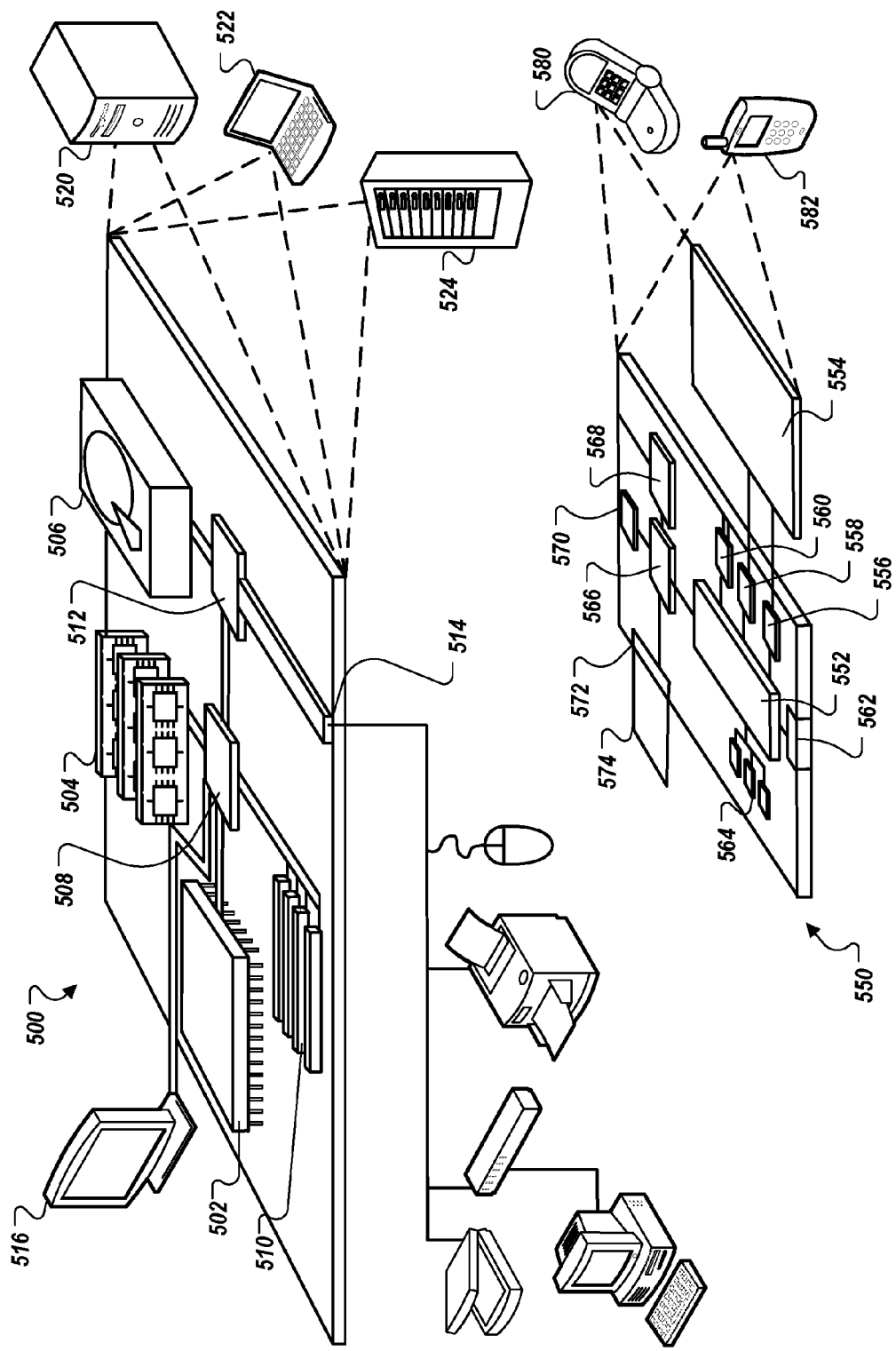
FIG. 5 is a schematic diagram that shows an example of a computing device and a mobile computing device.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

What is claimed is:

1. A method performed by data processing apparatus, the method comprising:
    identifying application signatures each representing one or more software applications, wherein each application signature includes operations each associated with a match score, and each application signature includes a total score threshold;
    receiving, by a network gateway on a network that hosts a computing device, a software application in a message addressed to the computing device;
    testing the software application with a first test in a sandbox, the first test comprising:
        monitoring operations performed by an execution of a software application instance;
        determining if a particular operation performed by the software application instance matches an operation included in a particular application signature representing a particular software application;
        in response to determining that the particular operation does not match any operations included in a particular application signature, maintaining a total score associated with the software application instance;
        in response to determining that the particular operation matches the operation included in the particular application signature, adding a match score associated with the particular operation to the total score;
    determining that the software application did not display malicious behavior in the first test in the sandbox based on the total score of the first test in the sandbox;
    returning, by the network gateway, the software application to the computing device responsive to determining that the software application did not display malicious behavior in the first test in the sandbox;
    receiving, by the computing device, the software application;
    responsive to receiving the software application by the computing device, testing the software application with the first test on the computing device;
    determining that the software application did display malicious behavior in the first test on the computing device based on the total score of the first test in the computing device; and
    responsive to determining that the software application did display malicious behavior in the first test on the computing device, classifying the software application as malicious.

2. The method of claim 1, wherein monitoring operations performed by a software application instance comprises:
    performing static analysis of one or more attributes of the software application instance.

3. The method of claim 2, wherein performing static analysis of one or more attributes of the software application instance comprises:
    determining if the one or more attributes match a preconfigured value in an application signature.

4. The method of claim 3, wherein the one or more attributes includes at least one of the group consisting of a Secure Hash Algorithm (SHA) value, an MD5 value, and a program name.

5. The method of claim 1, the method further comprising performing, responsive to classifying the software application as malicious, a configured action associated with the particular application signature.

6. The method of claim 5, wherein the configured action is selected from a plurality of actions based on a determination of a type of the computing device.

7. The method of claim 6, wherein the configured action comprises terminating network traffic with a server that served the particular software application.

8. The method of claim 6, wherein the configured action comprises powering down the computing device.

9. The method of claim 5, wherein the configured action comprises presenting a report identifying the software application as malicious.

10. The method of claim 9, wherein the report further comprises a human-readable description of the software application.

11. The method of claim 9, the method further comprising generating the report from a template document that includes at least an application-related fillable field.

12. A system comprising:
    one or more processors devices configured to execute computer program instructions; and
    computer storage media encoded with computer program instructions that, when executed by one or more processors, cause a computer device to perform operations comprising:
    identifying application signatures each representing one or more software applications, wherein each application signature includes operations each associated with a match score, and each application signature includes a total score threshold;
    receiving, by a network gateway on a network that hosts a computing device, a software application in a message addressed to the computing device;

testing the software application with a first test in a sandbox, the first test comprising:
  monitoring operations performed by an execution of a software application instance;
  determining if a particular operation performed by the software application instance matches an operation included in a particular application signature representing a particular software application;
  in response to determining that the particular operation does not match any operations included in a particular application signature, maintaining a total score associated with the software application instance;
  in response to determining that the particular operation matches the operation included in the particular application signature, adding a match score associated with the particular operation to the total score;
determining that the software application did not display malicious behavior in the first test in the sandbox based on the total score of the first test in the sandbox;
returning, by the network gateway, the software application to the computing device responsive to determining that the software application did not display malicious behavior in the first test in the sandbox;
receiving, by the computing device, the software application;
responsive to receiving the software application by the computing device, testing the software application with the first test on the computing device;
determining that the software application did display malicious behavior in the first test on the computing device based on the total score of the first test in the computing device; and
responsive to determining that the software application did display malicious behavior in the first test on the computing device, classifying the software application as malicious.

13. The system of claim 12, wherein monitoring operations performed by a software application instance comprises:
  performing static analysis of one or more attributes of the software application instance.

14. The system of claim 13, wherein performing static analysis of one or more attributes of the software application instance comprises:
  determining if the one or more attributes match a preconfigured value in an application signature.

15. The system of claim 14, wherein the one or more attributes includes at least one of the group consisting of a Secure Hash Algorithm (SHA) value, an MD5 value, and a program name.

16. The system of claim 12, the operations further comprising performing, responsive to classifying the software application as malicious, a configured action associated with the particular application signature.

17. The system of claim 16, wherein the configured action is selected from a plurality of actions based on a determination of a type of the computing device.

18. The system of claim 17, wherein the configured action comprises terminating network traffic with a server that served the particular software application.

19. The system of claim 17, wherein the configured action comprises powering down the computing device.

20. The system of claim 16, wherein the configured action comprises presenting a report identifying the software application as malicious.

21. The system of claim 20, wherein the report further comprises a human-readable description of the software application.

22. The system of claim 20, the operations further comprising generating the report from a template document that includes at least an application-related fillable field.

* * * * *

UNITED STATES PATENT AND TRADEMARK OFFICE
CERTIFICATE OF CORRECTION

PATENT NO. : 9,531,740 B2  
APPLICATION NO. : 15/073558  
DATED : December 27, 2016  
INVENTOR(S) : Paul Michael Martini and Peter Anthony Martini Page 1 of 1

It is certified that error appears in the above-identified patent and that said Letters Patent is hereby corrected as shown below:

In the Claims

Column 22, Line 54, Claim 12, after "processors" delete "devices".

Signed and Sealed this  
Thirtieth Day of July, 2019

Andrei Iancu  
*Director of the United States Patent and Trademark Office*